United States Patent
Venema

(10) Patent No.: US 7,345,993 B2
(45) Date of Patent: Mar. 18, 2008

(54) COMMUNICATION NETWORK WITH A RING TOPOLOGY

(75) Inventor: Jan A. W. Venema, Amersfoort (NL)

(73) Assignee: Lucent Technologies Inc., Murray Hill, NJ (US)

( * ) Notice: Subject to any disclaimer, the term of this patent is extended or adjusted under 35 U.S.C. 154(b) by 815 days.

(21) Appl. No.: 10/175,019

(22) Filed: Jun. 19, 2002

(65) Prior Publication Data

US 2003/0012131 A1  Jan. 16, 2003

(30) Foreign Application Priority Data

Jul. 10, 2001  (EP)  ................................ 01305944

(51) Int. Cl.
*G06F 11/00*  (2006.01)

(52) U.S. Cl. ..................... 370/222; 370/242; 370/404; 370/406; 714/2; 709/239; 709/250; 709/251

(58) Field of Classification Search ................ 370/222, 370/224, 242, 246, 243, 279, 293, 216, 389, 370/400, 487, 221, 241, 404, 406; 714/2, 714/100; 709/238, 239, 250, 251
See application file for complete search history.

(56) References Cited

U.S. PATENT DOCUMENTS

| 4,663,748 | A |   | 5/1987 | Karbowiak | 370/224 |
|---|---|---|---|---|---|
| 4,847,610 | A |   | 7/1989 | Ozawa | 340/3.44 |
| 5,042,031 | A |   | 8/1991 | Yokoyama | 370/223 |
| 5,301,185 | A | * | 4/1994 | Cherry | 370/216 |
| 5,396,357 | A | * | 3/1995 | Goossen et al. | 398/59 |
| 5,715,251 | A | * | 2/1998 | Du | 370/404 |
| 5,886,992 | A | * | 3/1999 | Raatikainen et al. | 370/410 |
| 6,069,720 | A | * | 5/2000 | Cotter et al. | 398/1 |
| 6,088,346 | A | * | 7/2000 | Du et al. | 370/338 |
| 6,101,191 | A | * | 8/2000 | Hashimoto et al. | 370/420 |
| 6,278,690 | B1 | * | 8/2001 | Herrmann et al. | 370/224 |
| 6,317,429 | B1 | * | 11/2001 | Nakata et al. | 370/360 |
| 6,542,511 | B1 | * | 4/2003 | Livermore et al. | 370/406 |
| 6,680,912 | B1 | * | 1/2004 | Kalman et al. | 370/238 |
| 6,804,776 | B1 | * | 10/2004 | Lothberg et al. | 713/160 |
| 6,822,972 | B1 | * | 11/2004 | Farhan | 370/487 |
| 6,891,828 | B2 | * | 5/2005 | Ngai | 370/357 |
| 6,952,395 | B1 | * | 10/2005 | Manoharan et al. | 370/219 |
| 6,992,976 | B1 | * | 1/2006 | Herrmann | 370/222 |
| 7,085,847 | B2 | * | 8/2006 | Darnell et al. | 709/232 |
| 2002/0159392 | A1 | * | 10/2002 | Klipper et al. | 370/242 |

FOREIGN PATENT DOCUMENTS

| EP | 0 863 646 A2 | 9/1998 |
|---|---|---|
| EP | 0 994 591 A2 | 4/2000 |
| WO | WO 97/13344 | 4/1997 |
| WO | WO 98/59454 | 12/1998 |

* cited by examiner

*Primary Examiner*—Hassan Kizou
*Assistant Examiner*—Brian T O'Connor

(57) ABSTRACT

Connections between communication nodes are established along a ring, with nodes at successive positions along the ring and two-way point to point communication connections between pairs of the nodes at successive positions along the ring. Data addressed to a node is split into parts that are transmitted to the node along opposite directions along the ring. Intermediate nodes forward the data. The nodes monitor the connections and other nodes to detect whether there is a failure of transmission along any direction and, if there is a failure along one of the directions, suppressing transmitting all of the data in a failing one of the directions.

13 Claims, 2 Drawing Sheets

COMMUNICATION NETWORK WITH A RING TOPOLOGY

CROSS REFERENCE TO RELATED APPLICATION

This application claims priority of European Application No. 01305944.9 filed on Jul. 10, 2001.

FIELD OF THE INVENTION

The field of the invention is a data communication network. The invention concerns in particular measures to improve the robustness of such networks against failure of a part of the network.

BACKGROUND

Data communication networks, such as a telecom network (telephone network), the internet or a private data network, support the establishment of point to point connections between network nodes. Such a point to point connection provides a fixed bandwidth on a (semi-)permanent basis for communication of data between the network nodes.

To increase the robustness of such networks against failure of connections, it is known to establish more than one connection between a pair of communicating nodes in parallel. The same data may be sent from one of the nodes to the other along all these connections to ensure that the data arrives even if one of the connections fails. Similarly, data may be sent along one of the connections and rerouted only if that one of the connections fails. Thus, the network can be made robust against failure of a connection at the price of establishing additional connections between the pair of nodes.

SUMMARY OF THE INVENTION

Amongst others, it is an object of the invention to provide for communication connections between a pair of nodes in a communication network, providing an extent of robustness against failures without reserving more than one connection for communication between the pair of nodes.

A communication network according to the invention includes at least three nodes with connections between the nodes, the network being arranged to establish connections at least according to the topology of a ring with nodes at successive positions along the ring and two-way point to point communication connections between pairs of the nodes at successive positions along the ring. Each particular one of the nodes is arranged to perform an input function receiving, from outside the nodes, external data addressed to a further one of the nodes; a split function splitting the external data into a first and second, mutually distinct part and sending the first and second part in a first and second, mutually opposite, direction along the ring respectively; a merge function for receiving a first and second part of internal data addressed to the particular one of the nodes from the first and second direction and merging the first and second part of the internal data; a forward function for forwarding parts of internal data not addressed to the particular one of the nodes from the first or second direction to the second and first direction respectively; and a monitor function for monitoring whether there is a failure of transmission along the first or second direction and, if there is a failure along one of the directions, suppressing the split function, all of the data being sent in a non-failing one of the directions.

According to the invention a ring of N connections are shared by N nodes (N being more than two). The connections between the nodes create a ring topology, one node being connected to another and so on until one arrives back at the original node. When a first node sends data to a second node, this data is sent along the connections of the ring and forwarded by intermediate nodes until the data arrives at the second node.

Each connection is two-way. As a result data can be sent from the first node to the second node in two directions along the ring (clockwise and counter-clockwise). The network tests whether the connections and intermediate nodes are operational. If a route in one direction along the ring from a first to a second node fails all of the data is sent along the non-failing direction. Thus, a minimum of disruption occurs when a direction fails at the cost of maintaining N connections between N nodes.

When the network has no failures data is sent from the first node to the second node distributed over the clockwise and counterclockwise directions. Thus, a maximum bandwidth is available for transmission when the network has no failures.

In an embodiment failure of connection is tested by sending test messages to neighbors of a particular one of the nodes in the ring and testing whether the particular one of the nodes receives such test messages from its neighbors, the particular one of the nodes reporting the nodes of failure of transmission to one or more of its neighbors when the particular one of the nodes does not receive such messages from at least one of its neighbors. Thus, the location of the failure can be readily located. Each node responds by desisting from the distribution of data for a destination node if there is a failure in a route to the destination node along a direction.

Preferably a predetermined portion of the bandwidth of each connection is guaranteed to be available for data sent from each node in either direction. Thus, each node will readily have bandwidth available if transmission to a second node fails in either direction along the ring. In an embodiment a node is able to send messages in excess of its predetermined portion of the bandwidth. Preferably, these messages have field indicating that they were sent in excess of the bandwidth. In this case these excess message can be deleted instead of forwarded when they would impede transmission of messages from other nodes. This allows more efficient use of bandwidth. Moreover, when transmission along one of the directions fails, the excess field allows nodes in a simple way to recover some at least of the lost bandwidth by using bandwidth vacated as a result of the failure.

BRIEF DESCRIPTION OF THE DRAWING

These and other advantageous aspects of the data communication network, network node and method according to the invention will be described in more detail using the following figures.

DETAILED DESCRIPTION

Figure 1:
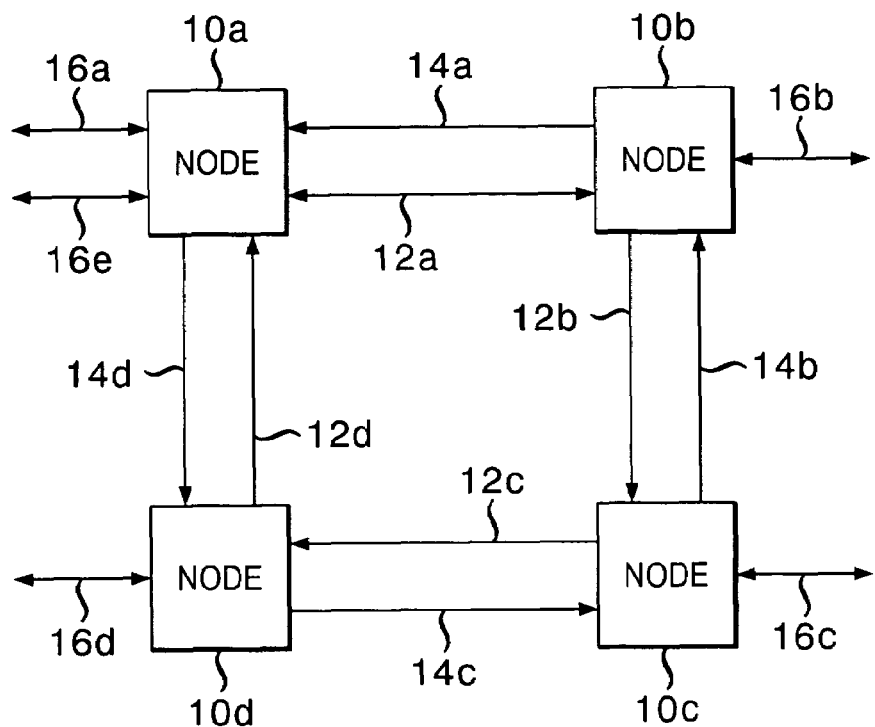
FIG. 1 shows a data communication network

FIG. 1 shows a data communication network. The network contains a number of nodes 10*a-d*. The nodes are connected in a ring topology with connections 12*a-d*, in clockwise direction and connections 14a-d in counter clockwise direction. Each node has its own external interface 16a-d, by way of example one node 10a is shown to have two external interfaces 16a,e.

It should be noted that the number of nodes shown in FIG. 1 (four) is selected merely by way of example. In practice three nodes or many more nodes may be used. Also, FIG. 1 merely shows connections 12a-d, 14a-d as far as used for describing the invention. In practice any pair of connections 12a-d, 14a-d that connects two nodes may be realized at least partly over a single physical connection (e.g. an optical fiber in which waves carrying information for the two connections travel in opposite directions). Also, any connection may be at least partly a connection established over a telephone network and/or over more than one physical networks.

Figure 2:
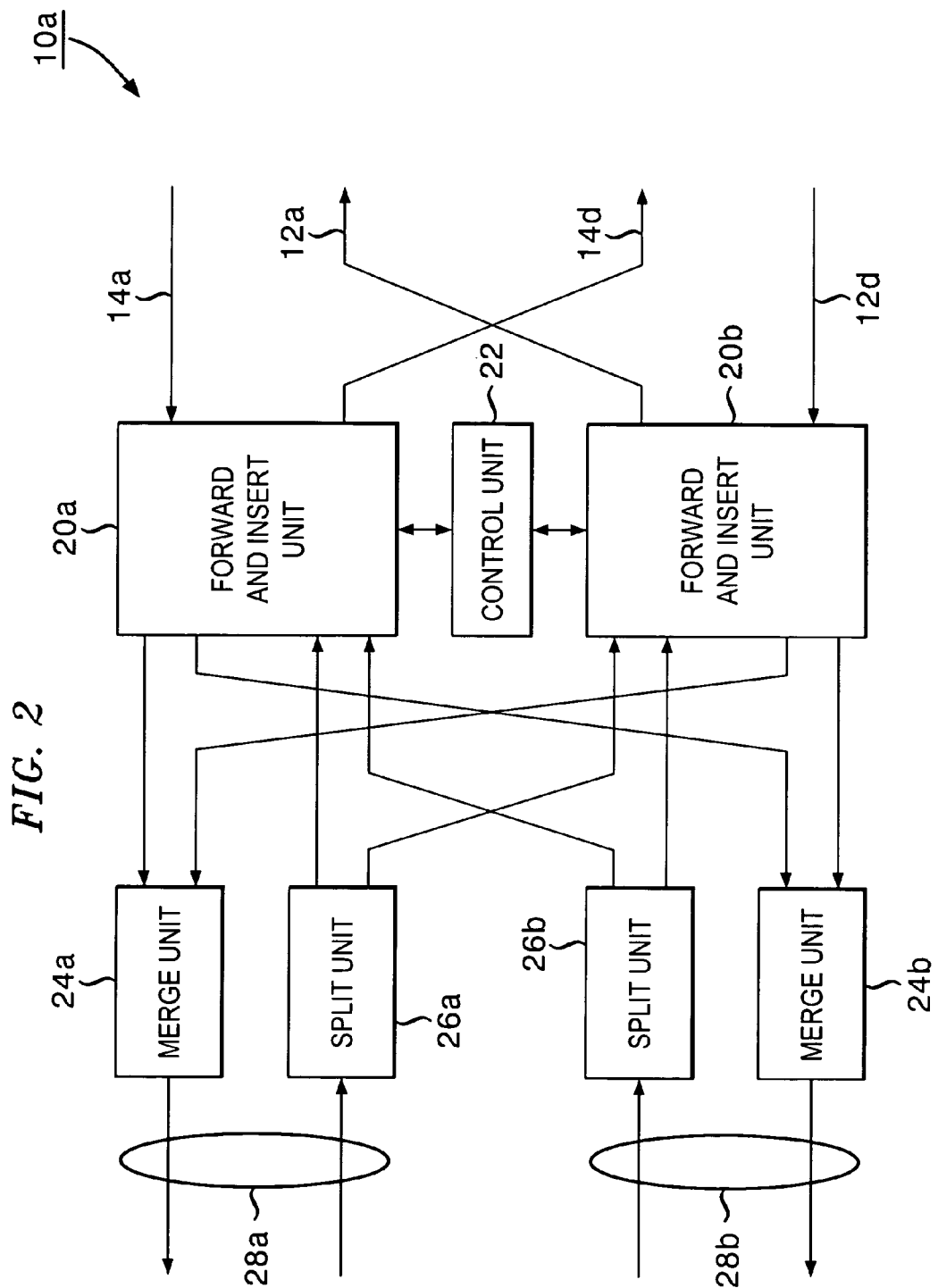
FIG. 2 shows a network node

FIG. 2 shows an embodiment of a network node 10a. By way of example, the node 10a has two external interfaces 28a,b. The node contains a first and second forwarding/insertion unit 20a,b, merge units 24a,b split units 26a,b and a control unit 22. The first forwarding/insertion unit 20a has an input coupled to a connection 14a for receiving data transmitted in the counter-clockwise direction and an output coupled to a connection 14d for transmitting data in the counter-clockwise direction. The second forwarding/insertion unit 20b has an input coupled to a connection 12d for receiving data transmitted in the clockwise direction and an output coupled to a connection 12a for transmitting data in the clockwise direction. The split units 26a,b have inputs coupled to respective ones of the external interfaces 28a,b and outputs coupled to both forwarding/insertion units 20a,b. The external interfaces 28a,b of FIG. 2 correspond with the interfaces 16a-e of FIG. 1.

The merge units 24a,b have inputs coupled to both forwarding/insertion units 20a,b and outputs coupled to respective ones of the external interfaces 28a,b. The control unit is coupled to the forwarding/insertion units 20a,b.

Figure 3:
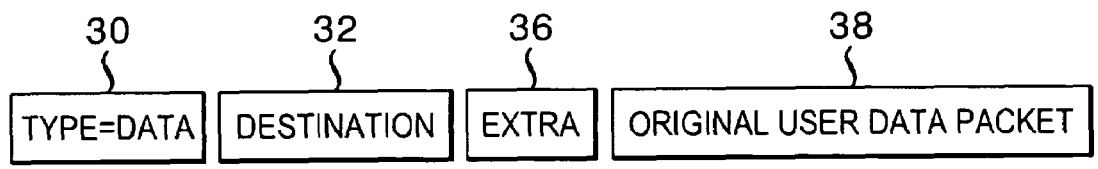
FIG. 3 shows a format of a data message

FIG. 3 shows a format of a data message sent over connections 12a-d, 14a-d. The message has a type field 30 for a type identifier (with a value that indicates that the message is a data message), a destination field 32 for an address of a destination node and interface, an extra field 36 for a service indicator and a content field 38 for a message content.

Figure 4:
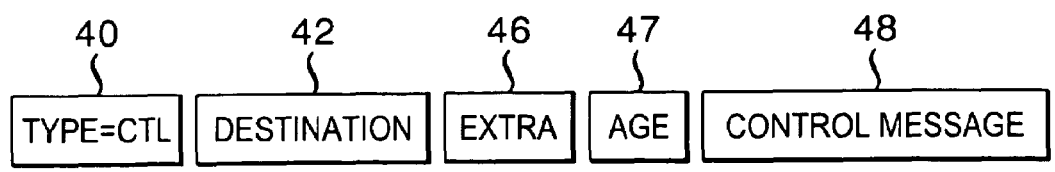
FIG. 4 shows a format of a control message

FIG. 4 shows a format of a control message sent over connections 12a-d, 14a-d. This message has a type field 40 for a type identifier (with a value that indicates that the message is a control message), a destination field 42 for an address of a destination node, an extra field 46 for a service indicator, an age field 47 and a content field 48 for a control message content. The destination field 42 in the control message need only indicate a destination node, in contrast to the destination field 32 of the data message, which preferably also indicates the interface for which the message is destined, if there is more than one such interface. Further fields, such as a source field to identify a source of the message, may be included but preferably such fields are omitted, to keep matters simple as possible.

In operation data messages having the format shown in FIG. 3 are sent along the connections 12a-d, 14a-d. Each split unit 26a,b receives a data-stream from its external interface 28a,b and forms messages in which data from the data stream is inserted in the content field 38. In the destination field 32 of these messages the split unit 26a,b inserts an address of the node 10a-b and external interfaces 16a,e for which the data is destined. The split units 26a,b send these messages to the forwarding/insertion units 20a,b for transmission to other nodes. Normally, each insert unit 26a,b sends substantially one half of these messages to the first forwarding/insertion unit 20a, the insert unit 26a,b sending the other half to the second forwarding/insertion unit 20b.

The forwarding/insertion units 20a,b receive messages from the connections 12d, 14a and from split units 26a,b. Dependent on whether a message received from the connections 12d, 14a contains an address of the node 10a and interface 16a,b in the destination field, the forwarding/insertion units 20a,b forward the message to a connection 12a, 14d or send to a merge unit 24a,b. Messages not destined for the node are forwarded to the connections 12a, 14d in the clockwise direction or the counter-clockwise direction, depending on whether these messages were received from a predecessor node in the clockwise direction or in the counter-clockwise direction respectively. As will be discussed in the following, a forwarding node may record information that the destination node has failed. In that case the forwarding node does not forward the data messages that are destined for the destination node. Instead they are deleted.

The forwarding/insertion units 20a,b insert messages received from split units among the forwarded messages. Thus, about half these inserted messages will circulate along the ring in clockwise direction and about half in counter-clockwise direction, being forwarded by nodes 10a-d until the messages reach a node 10a-d that has an address corresponding to the address in the destination field 32 of the message. There these messages will not be forwarded but fed to the merge units 24a-b.

When the address of the node 12a equals an address of the node 10a in the destination field, the forwarding/insertion units 20a,b sends the message to a merge unit 24a,b. Thus, both messages which have traveled in clockwise direction and message that have traveled in counter clockwise direction will arrive at the merge units 24a,b. The merge units 24a,b reassemble the original data stream received at an external interface 16a-e in its original order, if necessary buffering data to compensate for differences in transmission delay between messages that have arrived in clock wise direction and messages that have arrived in counter-clockwise direction.

Preferably, each node 12a-d is assigned its own predetermined portion of the bandwidth for transmission along the ring in clockwise and counter clockwise direction respectively. That is, it is ensured that the amount of data reaching the nodes 12a-d, excluding the data destined for the node, is less than or equal to the total available bandwidth of a connection minus the predetermined portion (on average: instantaneously the used bandwidth may be higher, but over a predetermined time interval the predetermined portion will be free). Thus, the node 12a-d will always be able to transmit data at a rate supported by the sum of the predetermined portions it has assigned to it in clockwise and counter clockwise direction.

Preferably, the node 12a-d is also allowed to use unused portions of the bandwidth of other nodes as far as this does not detract from the bandwidth reserved for the other nodes. For example for transmission of data from node A destined to node B in the portion assigned to node C, if the portion assigned to node C is unused and node C is not between nodes A and B in the direction along the ring in which data is transmitted from node A to B.

In an embodiment, this realized using the extra field 36. When a node 12a-d inserts a message in excess of the bandwidth allocated to that node, the nodes sets the extra field 36 in that message. If the message is not in excess of the bandwidth, the extra field is cleared. When the forwarding/insertion units 20a,b have to insert a message, but insufficient bandwidth would be available if all incoming messages destined beyond the forwarding/insertion unit 20a,b were forwarded, the forwarding/insertion unit 20a,b tests the extra field of these incoming messages. The forwarding/insertion unit 20a,b deletes (does not forward) a number of such messages in which the extra field is set to an extent that sufficient bandwidth is left for the messages that have to be inserted.

The deletion of such messages will be detected by the destination node 12a-d of these messages, when it detects reception of a message before it has received a preceding message. In response the destination node 12a-d will request retransmission of the preceding (deleted) message.

Alternatively, forwarding/insertion units 20a,b may monitor the destinations of the forwarded messages and insert only messages in excess of the assigned bandwidth if the forwarding/insertion units 20a,b detect that a preceding node 12a-d has not fully used its bandwidth and the destination of the inserted excess messages is not such that these messages need to be forwarded by that preceding node 12a-d (i.e. if the excess messages are not destined "beyond" that node).

Alternatively, each node 12a-b may have assigned to it portions of bandwidth for reception from the clockwise and counterclockwise direction respectively. In this case, nodes 12a-b will not insert data (at least not data in which the extra field 38 is cleared) destined for another node if the forwarded messages destined for that other node 12a-d in a direction already fill the assigned portion for that other node 12a-d. This has the advantage of ensuring that the node 12a-d will never receive more than a predetermined bandwidth.

If bandwidth is not available for data transmission from a node 12a,b, the node signals back to the external interface 28a,b in order to reduce the data rate from the external interface 28a,b for example by buffering or temporary suspension of data input.

Control unit 22 checks whether transmission in clockwise and counter-clockwise direction is operational. For this purpose, control unit 22 regularly sends test control messages to the forwarding/insertion units 20a,b for transmission to neighboring ones of the nodes 10a-d with which the node has direct connections 12a-d, 14a-d. A content of the type field 30 of the messages distinguishes control messages from the control unit from data messages from the split units 26a,b.

Forwarding/insertion units 20a,b receive test control messages from the neighboring ones of the nodes 10a-d and deliver these messages to control unit 22. When control unit 22 detects that such test control messages do not arrive regularly from the connection in the clockwise or counter-clockwise direction, control unit 22 reports a connection failure.

In response to detection of a connection failure control unit 22 sends a "route failed" control message to other nodes 10a-d in the network (or at least to those other nodes from which messages are destined to the node), in both the clockwise and counter-clockwise direction. The route failed control message reports the direction (clockwise or counter-clockwise) from which test control messages were not received. When control unit 22 receives such a route failed message from another node 10a-d, it signals the split units 26a,b that data messages for that node 10a-b should no longer be distributed over both forwarding/insertion units 20a,b, but that instead the messages should be sent exclusively to the forwarding/insertion units 20a,b for transmission in the direction for which no failure was reported.

When control unit 22 detects that control messages did not arrive regularly from a node 10a-d, the control unit will store information to indicate a "node failed" state for that node; in response to that information the control unit will stop the forwarding and deleting data messages destined to that node.

Of course, this may lead to a reduction of the available bandwidth for transmission between pairs of nodes, because data has to be transmitted in a single unobstructed direction, clockwise or counter-clockwise. The remaining bandwidth for transmission from a first node A (say 10a) to a second node B (say 10d) in one of these directions is at least half as large. However, preferably node A (10a) uses additional bandwidth in the unobstructed direction if such bandwidth has become free because of the obstruction. For example, if there is an obstruction, say at one point along the ring in clockwise direction between nodes A (10a) and C (say 10c), node C (10c) will not send messages in a direction of A (10a) via the obstruction. Therefore A (10a) does not have to forward such messages from C (10c) from that direction. Instead, A (10a) can insert messages (say for B (10d)) that it would otherwise send via C (10c) through the obstruction. As long as these message are not destined to nodes between C (10c) and the obstruction because this does not detract from the bandwidth reserved for C (10c). Thus, some of the bandwidth lost for transmission in one direction (clockwise or counter-clockwise) due to the obstruction is compensated by additional bandwidth gained in the other direction.

Optionally, the bandwidth allocated to nodes 10a-d may be reassigned for a time interval during which there is an obstruction. For example at least part of the bandwidth through the obstruction (say between nodes 10b and 10c in counter clockwise direction), which was originally assigned to a first node (10c) on a first side next to the obstruction may be reassigned. This bandwidth can be assigned without loss to a second node (10b) next to the obstruction (between 10b and 10c in counter-clockwise direction) on a second side of the obstruction opposite to the first side.

When control unit 22 detects that the test control messages start arriving regularly again from the connection in the clockwise or counter-clockwise direction, control unit 22 reports reestablishment of the connection to the other nodes 12a-d by sending a "route established" control message to other nodes 10a-d in the network (or at least to those other nodes from which messages are destined to the node), in both the clockwise and counter-clockwise direction. The route established control message reports the direction (clockwise or counter-clockwise) from which test control messages are received. When control unit 22 receives such a route established message from another node 10a-d, it signals the split units 26a,b that data messages for that node 10a-b may be distributed over both forwarding/insertion units 20a,b.

Preferably, control messages from a node 10a-d are sent with destination field set to the address of the node were data messages are generated. The control message is forwarded by all nodes and eventually should arrive at the sending node, where it recognized by destination field and is removed from the ring.

As shown in FIG. 4, control messages contains an age field 47 to prevent that data messages from failed nodes, or removed nodes, or data messages with invalid destination field keep circulating through the ring. When it inserts a control message a node 12a-d sets the age field 47 to an initial value. The forwarding/insertion units 20*a,b* increment the age field 47 of all control messages that they forward. If the forwarding/insertion units 20*a,b* detects that the age field 47 of a control message has been from the initial value more times than there are nodes along the ring, the forwarding/insertion unit 20*a,b* deletes the control message. Thus, it is prevented that messages keep circulating along the ring if a faulty destination node 12*a-d* fails to remove them or if they are erroneously addressed to a non-existent node 12*a-d*.

Of course the age field may be applied to the data messages as well as an alternative for the need to detect whether the data message is destined for a "failed" node. However, the data messages take up less bandwidth without the age field. Also the age field 47 may be omitted from the control messages if another mechanism is used to prevent indefinitely circulating messages, for example by using the source address of the message and information about the location of the nodes in the ring, to determine how far the message has traveled.

Preferably, data messages and control messages are processed by different hardware. Specialized, simple hardware logic, capable of handling simple data handling only is provided to process data messages at high forwarding speeds. A software module in control unit 22 is provided to handle the control messages separately. The control messages are sent to this software module, which provides for more sophisticated, but slower, processing than the hardware for handling data messages.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

The invention claimed is:

1. A node in a communication network, the network having at least three nodes with connections between the nodes, the network being arranged to establish connections at least according to the topology of a ring with nodes at successive positions along the ring and two-way point to point communication connections between pairs of the nodes at successive positions along the ring, each said nodes comprising:
   connection for input function receiving, from outside the nodes, external data addressed to a further one of the nodes;
   a split unit for splitting the external data into a first and second, mutually distinct part and sending the first and second part in a first and second, mutually opposite, direction along the ring respectively;
   a merge unit for receiving a first and second part of internal data addressed to the particular one of the nodes from the first and second direction and merging the first and second part of the internal data;
   a forwarding/inserting unit for forwarding parts of internal data not addressed to the particular one of the nodes from the first or second direction to the second and first direction respectively; and
   a control unit for monitoring whether there is a failure of transmission along the first or second direction and, if there is a failure along one of the directions, suppressing the split function, all of the data being sent in a non-failing one of the directions.

2. The node of claim 1, wherein said control unit is operable to perform the monitor function by sending test messages to its neighbors in the ring and testing whether the particular one of the nodes receives such test messages from its neighbors, the node reporting the nodes of failure of transmission to one or more of its neighbors when the particular one of the nodes does not receive such messages from at least one of its neighbors.

3. The node of claim 1, wherein the connections are fixed bandwidth connections, each particular one of the nodes having a fixed portion of the bandwidth assigned to it for transmission in clockwise and counterclockwise direction respectively.

4. The node of claim 3, wherein the data is sent in a sent data message having a format that contains a field for indicating whether the message is sent in excess of the fixed portion, the forward function being arranged to delete a received data message instead of forwarding the received data message, if said field in the received data message indicates that the received data message has been sent in excess of the fixed portion, when insufficient bandwidth would be available for inserting data messages between forwarded data messages if all data messages were forwarded.

5. The node of claim 1, wherein information is sent in a message having a format that contains an age field for indicating the number of times the message has been forwarded, the forward function being arranged to update the age field and to delete the message if the age field has been updated more times than there are nodes along the ring.

6. The node of claim 2, wherein the test message has a format that contains an age field for indicating the number of times the test message has been forwarded, the forward function being arranged to update the age field and to delete the test message if the age field has been updated more times than there are nodes along the ring, data being sent in data messages with a destination address field, the forward function being arranged to delete data messages containing a destination address for which it has been detected that the destination indicated in the destination field is not reachable.

7. The node of claim 2 wherein at least part of the connections are connections through a telephone network.

8. A method of communicating data network having connections at least according to the topology of a ring with nodes at successive positions along the ring and two-way point to point communication connections between pairs of the nodes at successive positions along the ring, the method comprising:

receiving external data addressed to a selectable one of the nodes from outside the nodes;

splitting the external data into a first and second, mutually distinct part and sending the first and second part in a first and second, mutually opposite, direction along the ring respectively to the addressed node;

forwarding the data along nodes in the first and second direction to the addressed node;

receiving the first and second part of internal data at the addressed node from the first and second direction and merging the first and second part of the internal data;

monitoring whether there is a failure of transmission along the first or second direction and, if there is a failure along one of the directions, suppressing said splitting, all of the data being sent in a non-failing one of the directions.

9. The method according to claim 8, wherein a node performs the monitor function by sending test messages to its neighbors in the ring and testing whether they receives such test messages from their neighbors, the nodes reporting the nodes of failure of transmission to one or more of their neighbors when they do not receive such messages from at least one of their neighbors.

10. The method of claim 8, wherein the connections are fixed bandwidth connections, each node having a fixed portion of the bandwidth assigned to it for transmission in clockwise and counterclockwise direction respectively.

11. The method of claim 10, comprising sending data in a sent data message having a format that contains a field for indicating whether the message is sent in excess of the fixed portion, said forwarding comprising deleting a received data message instead of forwarding the received data message, if said field in the received data message indicates that the received data message has been sent in excess of the fixed portion, when insufficient bandwidth would be available for inserting data messages between forwarded data messages if all data messages were forwarded.

12. The method according to claim 11, wherein information is sent in a message having a format that contains an age field for indicating the number of times the message has been forwarded, said forwarding comprising updating the age field and deleting the message if the age field has been updated more times than there are nodes along the ring.

13. The method according to claim 9, wherein each of the test messages has a format that contains an age field for indicating the number of times the message has been forwarded, said forwarding comprising updating the age field and deleting the message if the age field has been updated more times than there are nodes along the ring, data being sent in data messages with a destination address field, forwarding comprising deleting data messages that contain a destination address for which it has been detected that the destination indicated in the destination field is not reachable.

\* \* \* \* \*